United States Patent
Kalhan

(10) Patent No.: US 8,102,825 B2
(45) Date of Patent: Jan. 24, 2012

(54) DETECTION OF A MULTI-MODE PORTABLE COMMUNICATION DEVICE AT A MESH NETWORK

(75) Inventor: Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 761 days.

(21) Appl. No.: 11/565,323

(22) Filed: Nov. 30, 2006

(65) Prior Publication Data

US 2008/0130596 A1    Jun. 5, 2008

(51) Int. Cl.
*H04W 4/00* (2009.01)
*H04W 40/00* (2009.01)
*H04W 36/00* (2009.01)

(52) U.S. Cl. .................. 370/338; 455/445; 455/436

(58) Field of Classification Search .................. 370/338
See application file for complete search history.

(56) References Cited

U.S. PATENT DOCUMENTS

| | | | |
|---|---|---|---|
| 4,737,978 A | 4/1988 | Burke et al. | |
| 5,208,756 A * | 5/1993 | Song | 455/456.3 |
| 5,293,645 A | 3/1994 | Sood | |
| 6,011,974 A * | 1/2000 | Cedervall et al. | 455/456.4 |
| 6,434,367 B1 | 8/2002 | Kumar et al. | |
| 6,965,585 B2 | 11/2005 | Grilli et al. | |
| 6,990,324 B2 | 1/2006 | Laroia et al. | |
| 7,050,819 B2 | 5/2006 | Schwengler et al. | |
| 7,167,712 B2 | 1/2007 | Ogino et al. | |
| 7,286,834 B2 * | 10/2007 | Walter | 455/456.1 |
| 7,433,673 B1 | 10/2008 | Everson et al. | |
| 7,610,049 B2 | 10/2009 | Watanabe | |
| 2003/0118015 A1 | 6/2003 | Gunnarsson et al. | |
| 2004/0051664 A1 * | 3/2004 | Frank | 342/457 |
| 2004/0090937 A1 | 5/2004 | Chaskar et al. | |
| 2004/0116133 A1 | 6/2004 | Kalhan et al. | |
| 2004/0198220 A1 | 10/2004 | Whelan et al. | |
| 2005/0059400 A1 | 3/2005 | Jagadeesan et al. | |
| 2005/0090277 A1 | 4/2005 | Islam et al. | |

(Continued)

FOREIGN PATENT DOCUMENTS

EP    0504122    9/1992

(Continued)

OTHER PUBLICATIONS

Han, et al. "A Method to Support Femto-Macro Handover with Minimal Interference to the Macro Network" IP.com Journal Oct. 16, 2008, pp. 1-4, West Henrietta, NY US.

(Continued)

*Primary Examiner* — Lester Kincaid
*Assistant Examiner* — Andy Gu

(57) ABSTRACT

A mesh network communication system includes a plurality of access points connected to a wireless local area network (WLAN) controller where at least one of the plurality access points is a detection access point (DAP) that received reverse link (RL) wireless wide area network (WWAN) signals transmitted from a multi-mode wireless communication device. Based on an intercepted RL WWAN signal, the DAP forwards reverse link (RL) information to the WLAN controller. Based on the RL information, the WLAN controller sends a device proximity message to the WWAN communication system where the device proximity message is based on the proximity of the multi-mode communication device to the mesh network communication network. One or more non-detection access points (NDAPs) of the plurality of access points are capable of providing WLAN service, and may also have the capability to receive RL WWAN signals, but do not send RL information to the WLAN controller.

40 Claims, 10 Drawing Sheets

U.S. PATENT DOCUMENTS

| | | |
|---|---|---|
| 2005/0197132 A1 | 9/2005 | Lee et al. |
| 2005/0237963 A1 | 10/2005 | Storm |
| 2005/0282494 A1 | 12/2005 | Kossi et al. |
| 2006/0025138 A1* | 2/2006 | Kotzin ............ 455/445 |
| 2006/0040656 A1 | 2/2006 | Kotzin |
| 2006/0056448 A1 | 3/2006 | Zaki et al. |
| 2006/0073840 A1* | 4/2006 | Akgun et al. ........ 455/456.3 |
| 2006/0114885 A1 | 6/2006 | Baek et al. |
| 2006/0121916 A1 | 6/2006 | Aborn et al. |
| 2006/0203743 A1* | 9/2006 | Quinn et al. ............ 370/254 |
| 2006/0268902 A1 | 11/2006 | Bonner |
| 2007/0002813 A1 | 1/2007 | Tenny et al. |
| 2007/0010261 A1* | 1/2007 | Dravida et al. ........ 455/456.3 |
| 2007/0021127 A1 | 1/2007 | Zheng |
| 2007/0049276 A1* | 3/2007 | Rimoni et al. ............ 455/436 |
| 2007/0104139 A1* | 5/2007 | Marinier et al. .......... 370/329 |
| 2007/0121560 A1 | 5/2007 | Edge |
| 2007/0140190 A1 | 6/2007 | Rensburg et al. |
| 2007/0149211 A1 | 6/2007 | Dunn et al. |
| 2007/0177530 A1 | 8/2007 | Ando et al. |
| 2007/0184845 A1 | 8/2007 | Troncoso |
| 2007/0254620 A1 | 11/2007 | Lindqvist et al. |
| 2008/0130555 A1 | 6/2008 | Kalhan |
| 2008/0130597 A1 | 6/2008 | Kalhan |
| 2008/0130598 A1 | 6/2008 | Kalhan |
| 2008/0153497 A1 | 6/2008 | Kalhan |
| 2008/0261615 A1 | 10/2008 | Kalhan |
| 2009/0213819 A1 | 8/2009 | Kalhan |
| 2009/0215400 A1 | 8/2009 | Chang et al. |

FOREIGN PATENT DOCUMENTS

| | | |
|---|---|---|
| EP | 1816888 | 8/2007 |
| EP | 1986341 | 10/2008 |
| JP | 07-154848 | 6/1995 |
| JP | 2005-110314 | 4/2005 |
| WO | WO 98/19474 | 5/1998 |
| WO | WO 02/054820 A2 | 7/2002 |
| WO | WO 2004/002051 | 12/2003 |
| WO | WO 2004/054153 | 6/2004 |
| WO | WO 2004/057815 | 7/2004 |
| WO | WO 2004/084463 A2 | 9/2004 |
| WO | WO 2005/076639 | 8/2005 |
| WO | WO 2007/064822 | 6/2007 |
| WO | WO 2008/066926 | 6/2008 |
| WO | WO 2008/066927 | 6/2008 |
| WO | WO 2008/066928 | 6/2008 |
| WO | WO 2008/066929 | 6/2008 |
| WO | WO 2008/091412 | 7/2008 |
| WO | WO 2009/067700 | 5/2009 |

OTHER PUBLICATIONS

Carstens, Juergen, "A Method for Interference Control and Power Saving for Home Access Point", IP.Com Journal, Dec. 13, 2007, pp. 1-3, West Henrietta, NY US.

Alejandro R. Holman and Edward G. Tiedemann Jr., "CDMA Inter-system Operations", 1994 IEEE 44th Vehicular Technology Conference, Jun. 8, 1994. pp. 590-594, Stockholm Sweden.

* cited by examiner

DETECTION OF A MULTI-MODE PORTABLE COMMUNICATION DEVICE AT A MESH NETWORK

RELATED APPLICATIONS

This application is related to U.S. patent application entitled "APPARATUS, SYSTEM AND METHOD FOR MANAGING WIRELESS LOCAL AREA NETWORK SERVICE TO A MULTI-MODE PORTABLE COMMUNICATION DEVICE", Ser. No. 11/565,266 U.S. patent application entitled "MANAGEMENT OF WLAN AND WWAN COMMUNICATION SERVICES TO A MULTI-MODE WIRELESS COMMUNICATION DEVICE", Ser. No. 11/565,419, and U.S. patent application entitled "APPARATUS, SYSTEM AND METHOD FOR MANAGING WIRELESS LOCAL AREA NETWORK SERVICE BASED ON A LOCATION OF A MULTI-MODE PORTABLE COMMUNICATION DEVICE", Ser. No. 11/565,383, all filed concurrently with this application and all incorporated by reference in their entirety, herein.

TECHNICAL FIELD

The invention relates in general to wireless communication systems and more specifically to the detection of a multi-mode wireless communication device at a mesh network.

BACKGROUND

Wireless local area networks (WLANs) and wireless wide area networks (WWANs) provide wireless communication services to portable devices where the WLANs typically provide services within geographical service areas that are smaller than the geographical areas serviced by WWANs. Examples of WWANs include systems that operate in accordance with 2.5G (such as cdma2000), 3G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 1000 feet per base station. Base stations in WLANs are typically referred to as access points. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. In order to provide a wireless user with the increased overall performance and continuous connectivity, multi-mode mode and dual-mode portable communication devices have been developed allowing the communication device to access the particular type of network that provides the most desirable tradeoffs. A multi-mode wireless communication device includes the appropriate components and functionality for communicating within more than one network. For example, a dual-mode portable communication device can communicate within a WWAN and a WLAN.

WLANs are often configured within a mesh network where several access points are managed by one or more WLAN controllers. The WLAN controller manages and controls system-wide functions and the access points manage and control local functions such as communication setup and acknowledgement (handshaking), and establishing beacons for mobile devices.

Unfortunately, conventional techniques for managing the connection status between the portable communication device and the access point are limited in that they require GPS location information or include inefficient searching mechanisms executed by the portable communication device in order to establish service with a new network for performing a handoff between networks. For example, some conventional systems require the mobile communication device to periodically tune to an alternate network channel in an attempt to detect an alternate network resulting in significant power consumption with a limited success rate of detecting alternate networks. A conventional mobile communication device must continually, or at least periodically, search for a mesh network to determine if a mesh network is available.

Accordingly, there is a need for an apparatus, system, and method for detection of multi-mode portable communication devices at a mesh network.

SUMMARY

A mesh network communication system includes a plurality of access points connected to a wireless local area network (WLAN) controller where at least one of the plurality access points is a detection access point (DAP) that received reverse link (RL) wireless wide area network (WWAN) signals transmitted from a multi-mode wireless communication device. Based on an intercepted RL WWAN signal, the DAP forwards reverse link (RL) information to the WLAN controller. Based on the RL information, the WLAN controller sends a device proximity message to the WWAN communication system where the device proximity message is based on the proximity of the multi-mode communication device to the mesh network communication network. One or more non-detection access points (NDAPs) of the plurality of access points are capable of providing WLAN service, and may also have the capability to receive RL WWAN signals, but do not send RL information to the WLAN controller.

DETAILED DESCRIPTION

Figure 1A:
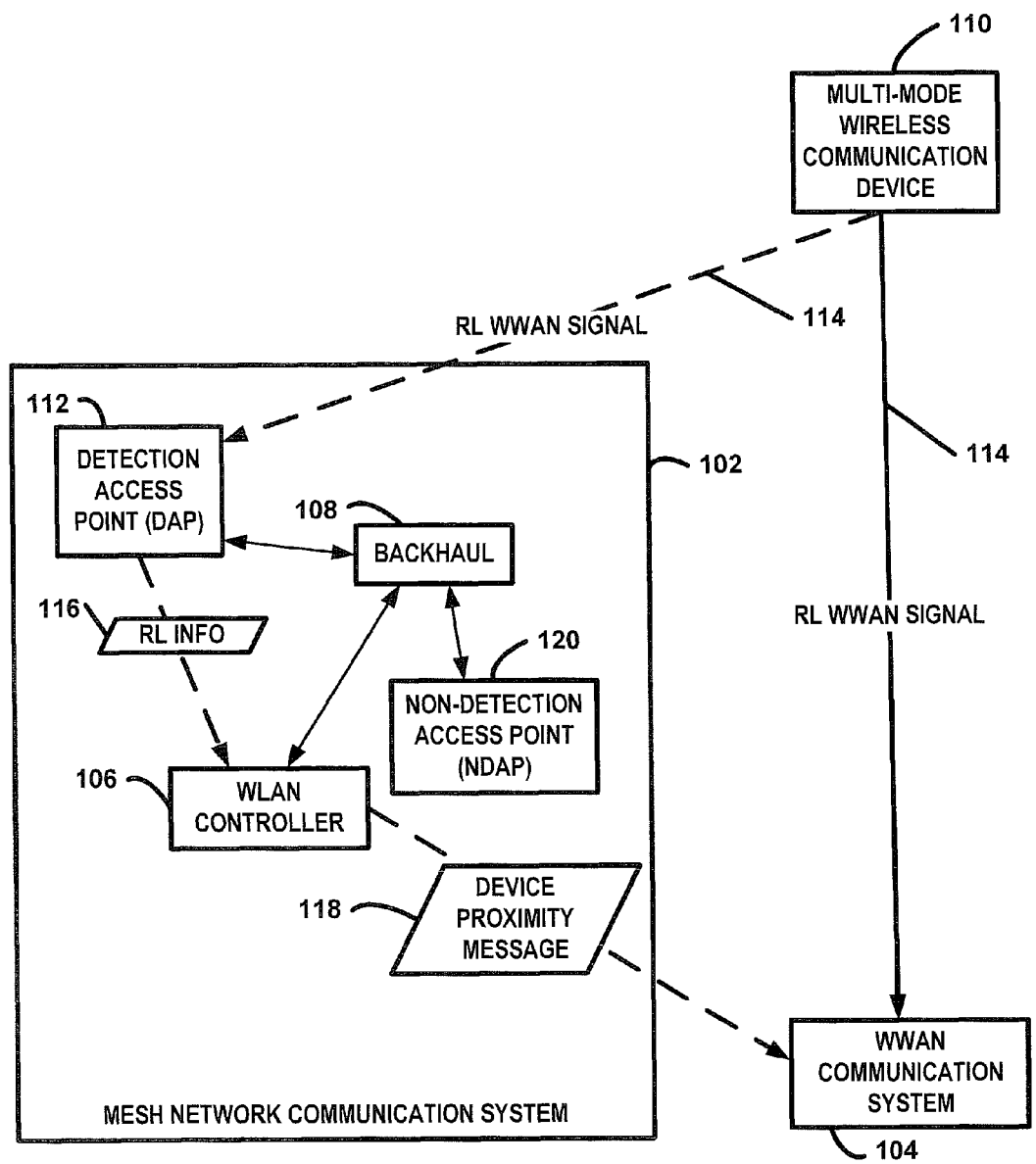
FIG. 1A is a block diagram of a communication network arrangement including a mesh network communication system and a wireless wide area network (WWAN) communication system in accordance with the exemplary embodiment of the invention.

FIG. 1A is a block diagram of a communication system arrangement 100 including a mesh network communication system 102 and a WWAN communication system 104. The mesh network communication system 102 includes a plurality of wireless access points connected to a WLAN controller 106 through a backhaul 108. As discussed in further detail below, a multi-mode wireless communication device (communication device) 110 is wireless device capable of communicating on both systems 102, 104. The plurality of access points includes at least one detection access point (DAP) 112 that intercepts and receives RL WWAN signals 114 transmitted by the communication device 110 to the WWAN communication system 104. The DAP 112 transmits reverse link (RL) information 116 to the WLAN controller 106 where the RL information 116 is based on the received RL WWAN signal 114. The WLAN controller 106 sends a device proximity message 118 based on the RL information 114 and possibly other factors. The device proximity message 118 can be any type of message that includes data derived from, based on, or otherwise related to the proximity of the communication device 110 to one or more access points. The device proximity message 118, for example, may be a request of the WWAN communication system 104 to invoke a procedure to acquire WLAN services for the communication device 110 from the mesh network communication system 102. In some circumstances, the device proximity message 118 provides an indication of the distance(s) between the communication device 110 and one or more access points. The plurality of access points also includes one or more non-detection access points (NDAPs) 120 that do not transmit RL information 116 to the WLAN controller 106. In some circumstances, an NDAP may have the capability to receiver RL WWAN signals and to transmit RL information 114 but is configured not to transmit the RL information 114. Also, some of the NDAPs may not have the capability to receive RL WWAN signals. In the exemplary embodiment, an access point with DAP capabilities is dynamically configured to be a DAP or NDAP. As discussed in further detail below, such a dynamic arrangement may be useful where conditions change. For example, reconfiguring an access point as a DAP or NDAP may be appropriate and efficient in response to expansion and contraction of WWAN service areas.

Determining which access points will operate as DAPs in a particular mesh network communication system 102 may be based on any suitable criteria including any number of factors. Examples of some suitable factors include physical characteristics such as building locations, building entrances, building exists and geographic characteristics, WWAN and WLAN service area characteristics, network capacities, and traffic flow of communication devices. In the exemplary embodiment, DAPs are selected based on a relationship between access point service areas and a criteria area. An access point that is selected to be a DAP has a DAP service area that at least partially overlaps with the criteria area is not completely surrounded by other access points services areas that have at least a portion that overlaps with the criteria area. In other words, a DAP service area is not surrounded by other DAP service areas.

Figure 1B:
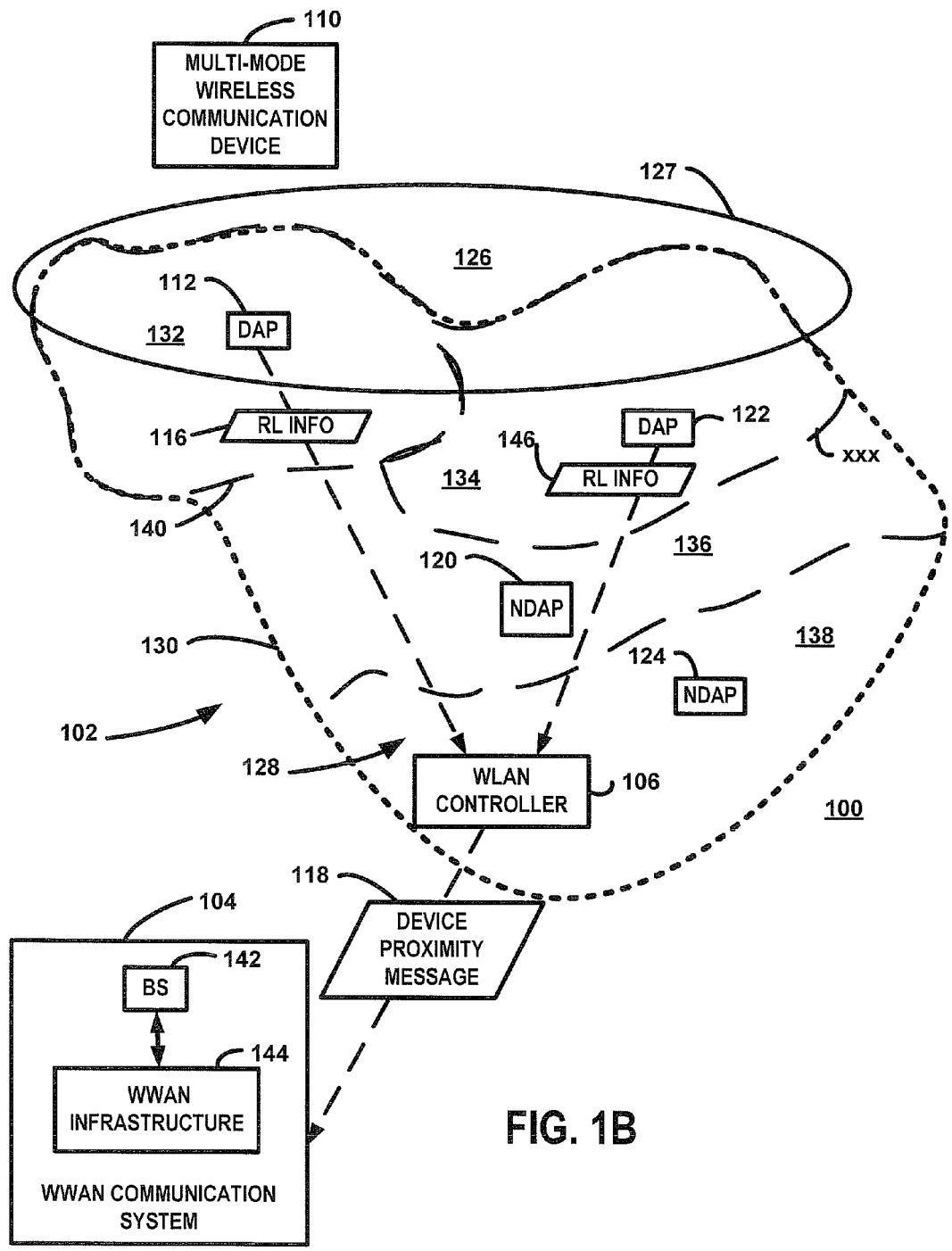
FIG. 1B is a block diagram of the communication system arrangement with an exemplary criteria area.

FIG. 1B is a block diagram of the communication system arrangement 100 with an exemplary criteria area 126. Only four access points 112, 122, 120, 124 are shown in FIG. 1B in the interest of brevity and clarity. Any number of DAPs and NDAPs may form a mesh network communication system 102. The mesh network communication system 102 provides wireless local area network (WLAN) service within a mesh network service area 128 defined by a mesh network perimeter 130. Access points 112, 122, 120, 124, provide WLAN service within WLAN service areas 132, 134, 136, 138 within the mesh network service area 128 to collectively form the mesh network service area 128. The access points include at least one detection access point (DAP) 112 that provides WLAN service within a DAP service area 132 and at least one non-detection access point (NDAP) 120 for providing WLAN service within a NDAP service area 136. FIG. 1B shows one other DAP 122 providing WLAN service within a DAP service area 134. The DAP service area 132 is defined by a DAP perimeter 140 and at least partially overlaps with a criteria area 126 having a criteria perimeter 127 where no portion of any NDAP service area 136 is closer to the criteria perimeter 127 than the DAP service area 132. Therefore, the DAP service area perimeter includes at least a portion that is closer to the criteria area perimeter than any other access point service area that at least partially overlaps the criteria service area. As discussed above, any of numerous factors and techniques may be used to establish the criteria area 126. The criteria area 126 is illustrated as an ellipse in FIG. 1B. The criteria area 126, however, may have any of numerous shapes and sizes and is defined by the WLAN controller 106. Further, the criteria area 126 may include multiple discrete enclosed areas. For example, the criteria area 126 may include two circles having centers at entrances of a building. The criteria area 126 may be defined in three dimensions, and therefore, may be extended to a criteria volume in some situations. For example, a criteria area 126 for a mesh network implemented within a multiple floor building may be include defined areas for each floor. In the exemplary embodiment, the DAP service areas 132, 134 are not completely surrounded by other DAP areas. Since a communication device 110 must pass through a DAP area 132 before entering a surrounded access point service area, the DAPs within the surrounding DAP service areas will detect the approaching communication device 110 before it enters the surrounded area.

The access points 112, 122, 120, 124 provide WLAN services to WLAN communication devices within the corresponding WLAN service area 132, 134, 136, 138. A wireless wide area network (WWAN) communication system 104 provides WWAN services to WWAN devices within a WWAN service area (not shown). The multi-mode wireless communication device 110 is capable of operating in both systems 102, 104 and can receive WWAN services and WLAN services. As described above, the term WWAN is used primarily to distinguish this group of diverse technologies from WLANs that typically have smaller service areas on the order of 100 to 1000 feet per base station. Accordingly, the WWAN communication system 104 is any system that provides wireless communication services within relatively large geographical areas as compared to WLANs. Examples of WWAN systems 104 include cellular communication systems that provide cellular communication services through at least one base station 142 connected to a WWAN infrastructure 144 such as a cellular system infrastructure (144). The WWAN infrastructure 136 may include one or more core networks that are connected to a global network such as Internet Protocol (IP) network or public switched telephone network (PSTN). In the exemplary embodiment, the WWAN communication system 104 operates using packet switching communication techniques. In such systems, the communication infrastructure is a packet switched core network and includes an access gateway for interfacing to WLANs using IP signaling. The WWAN communication system 104, however, may operate in accordance with circuit switched communications in some circumstances. The WWAN communication system 104 may operate using any of numerous protocols and schemes. Examples of some Code Division Multiple Access (CDMA) standards include cdma2000 1×, 1×EV-DO, and W-CDMA. In some circumstances, the WWAN communication system 104 may operate with other standards such as OFDM based standards or GSM standards, for example. In an embodiment discussed below, the WWAN system 104 is an OFDM system that operates in accordance with IEEE 802.16(e) standards often referred to as WiMax. The various functions and operations of the blocks described with reference to the WWAN communication system 104 may be implemented in any number of devices, circuits, or elements. Two or more of the functional blocks may be integrated in a single device and the functions described as performed in any single device may be implemented over several devices. For example, at least portions of the functions of the WWAN infrastructure 144 may be performed by the base station 142, a base station controller, or the MSC in some circumstances.

The access points 112, 120, 122, 124 are any devices capable of providing wireless local area network (WLAN) services and that can communicate with a WLAN controller 106. Although the access points are fixed access points that are connected through a wireless backhaul 108 to the WLAN controller 106 in the exemplary embodiment, the access points may be connected to the WLAN controller 106 through a wired backhaul 108 in some circumstances. A suitable backhaul 108 is a backhaul operating in accordance with IEEE 802.11(a) standards. Each of the access points provides WLAN service to communication devices 110 within adequate range of the access point where the range is illustrated by the respective DAP service areas 132, 134 and NDAP service areas 136, 138. An example of suitable technique for providing WLAN service includes operation in accordance with a WLAN protocol such as WiFi or any of the protocols defined in the IEEE 802.11 standards.

The WLAN controller 106 is any device that can manage and control communications within the mesh network communication system 102. In the exemplary embodiment, the WLAN controller 106 includes hardware and software for performing calculations, communicating with the WWAN communication system 104 and with the access points 112, 120, 122, 124 and facilitating the overall functionality of the mesh network communication system 102. The exemplary mesh network communication system 102 utilizes a split media access control (MAC) architecture where processing of data and management protocols is distributed over the WLAN controller and the access points. The WLAN controller 106 generally provides processing of data and management protocol on the system level and the access points manage local functions such handshaking with mobile devices and providing beacons. Messages sent from the WLAN controller to the WWAN communication system 104 may be sent using any combination of wired and/or wireless communication methods. In the exemplary embodiment, the WLAN controller 106 is connected to an access gateway in a core network and sends messages using packet switched data techniques, either through an IP network or through an access router that may be part of a network interface within the WLAN controller 106. In some circumstances, messages can be sent from the WLAN controller 106 through a PSTN. In other circumstances, a transmitter may be used to wirelessly transmit the messages to the base station 142 which are then forwarded to the WWAN infrastructure 144. The WLAN controller 106 may be an access point with assigned controller responsibilities for the mesh network communication system 102 in some situations.

The multi-mode wireless communication device 110 is any type of communication device that is capable of communicating with at least one WLAN system and at least one WWAN system 104. The multi-mode wireless communication device 110, sometimes referred to as an access terminal, may be a wireless modem, a personal digital assistance, dual mode cellular telephone, or other such device.

Accordingly, the access points 112, 120, 122, 124 facilitate communication to a WLAN of the mesh network communication system 102 and the WWAN communication system 104 facilitates communication to a WWAN, where the communication device 110 is capable of communicating on both of the networks. The communication device 110 can access wireless services provided by either of the networks when resources are available on the particular network and signal quality is adequate. In the exemplary embodiment, the communication device 110 may access both networks simultaneously under certain conditions. In some circumstances, however, the communication device 110 may be able only to access one of the networks at any given time. In another scenarios, the communication device 110 may be able to access only control channels of the WWAN network but have full access of WLAN network or vice versa. The coverage area of the WWAN communication system 104 may have poor quality areas or areas where no WWAN service is available. These areas, however, may have good coverage from a WLAN system. Such a scenario may occur where the WLAN coverage is within a building such as an office or home and the WWAN coverage is generally available in the area of the building but lacking within the building due to walls and other signal obstructions. In addition to other advantages, managing wireless services in accordance with the exemplary embodiments maximizes the quality of the wireless services provided to the communication devices 110.

In accordance with the exemplary embodiment, the mesh network communication system 102 manages wireless service to one or more multi-mode wireless communication devices 110 by evaluating reverse link WWAN signals transmitted by the multi-mode communication devices 110 and received at one or more DAP access points 112, 122. Based on a calculated or estimated proximity of the communication device 110 to the one or more DAP access points 112, 120 the mesh network communication system 102 sends a device proximity message 118 to the WWAN communication system 104. In the exemplary embodiment, the device proximity message 118 is a request message requesting the execution of a WLAN acquisition procedure. In response to the device proximity message 118, the WWAN infrastructure sends a message to the communication device 110 instructing the communication device 110 to search for WLAN wireless service from the mesh network communication system 102 or to establish wireless service from the mesh network communication system 102. In some situations, the WWAN infrastructure 144 may evaluate other parameters before instructing the communication device 110. For example, due to subscriber parameters, system settings, or system parameters, the WWAN infrastructure may determine that the communication device 110 should not acquire WLAN service. In the exemplary embodiment, the DAP access points 112, 122 receive the RL WWAN signals transmitted from a communication device 110 and send RL signal information 116, 146 to the WLAN controller 106. The RL signal information 116, 146 may include or be based on any of numerous measured or calculated parameters related to a received RL WWAN signal. In the exemplary embodiment, a transmission time, a reception time, and reception power are included in the RL signal information 116, 146 that is sent to the WLAN controller 106. The WLAN controller 106 evaluates the information and determines whether to send a device proximity message 118 to the WWAN communication system 104. In some implementations, however, at least some of the evaluation of the RL WWAN signals may be performed by the access point receiving the RL WWAN signal. For example, the DAP can calculate a time offset equal to the time difference between the signal transmission time and the signal reception time.

The WWAN communication system 104 at least performs an evaluation in response to the device proximity message 110 and may perform or initiate the acquisition procedure of WLAN wireless service to the communication device 110 in response to the device proximity message 118. The acquisition may result in a handoff of the communication device 110 from the WWAN to the mesh network 102 in some circumstances or may result in the communication device 110 receiving wireless service from two networks simultaneously. Further, the communication device 110 may maintain registration with the WWAN system 104 although user data is only exchanged on the mesh network 102. In the exemplary embodiment, the device proximity message 118 is sent through either an IP network or an access router to an access gateway in the WWAN. In some circumstances, however, the device proximity message 118 is sent through a wireless link. For example, the message could be sent as a reverse link WWAN signal where the WLAN controller 106 includes a WWAN transmitter.

When the WWAN communication system 104 is providing wireless communication services to the communication device 110, the DAP access points 112, 122, at least periodically, monitor the WWAN reverse link channel used by the communication device 110 to transmit WWAN reverse link signals. In some cases, the access points 112, 122 may employ procedures to detect multiple multi-mode communication devices 110. Based on the WWAN reverse link signal received at the DAP access point 112, 122, the DAP access point 112, 122 transmits the RL signal information 116, 146 to the WLAN controller 106. Based on the RL signal information, 116, 146 the WLAN controller 106 determines if the communication device 110 should at least search for WLAN service. In some circumstances, the WLAN controller 106 determines that the mesh network 102 should provide WLAN communication service to the communication device 110. When the WLAN controller 106 determines that the communication device 110 is within range of an access point, the WLAN controller 106 transmits the device proximity message 118 to the WWAN communication system 104 indicating that the communication device 110 is likely within the mesh network service area 106. The WWAN system 104 then performs the WLAN acquisition procedure which may include an instruction for the communication device 110 to search for WLAN service, to search for a particular access point 112, 122 and/or to acquire WLAN service.

Figure 1C:
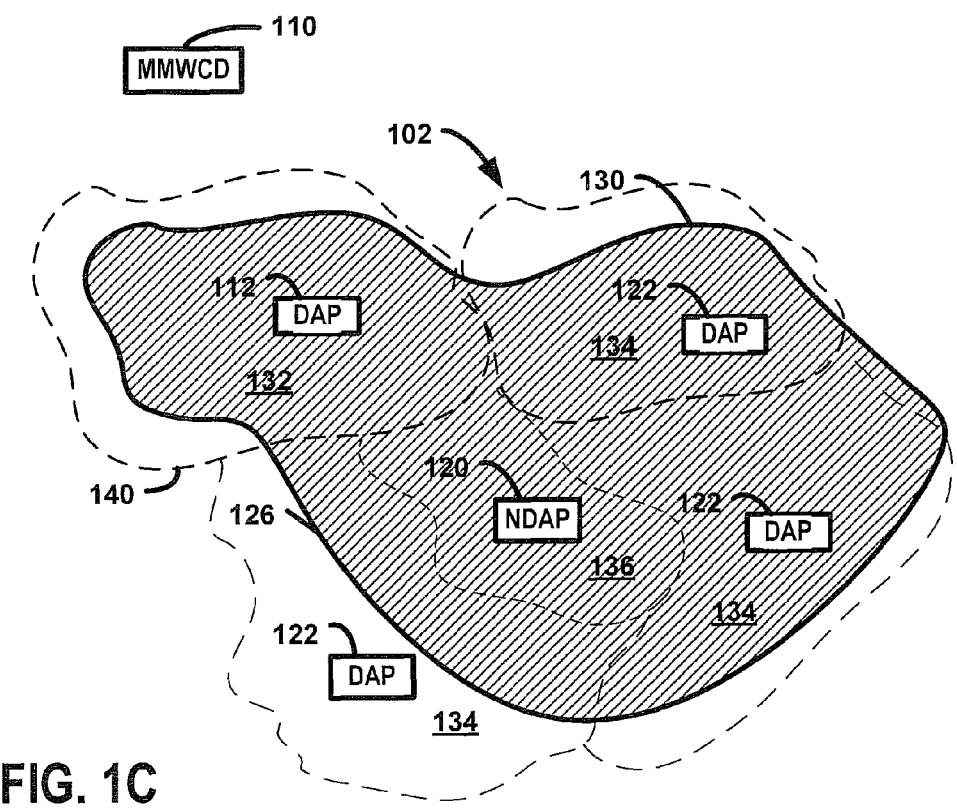
FIG. 1C is a block diagram of a mesh network service area where the criteria area is enclosed within the mesh network service area.

FIG. 1C is a block diagram of a mesh network service area 128 where the criteria area is within the mesh network service area 128. At least a portion of the DAP service areas 132, 134 overlap with the criteria area 130. Although the NDAP service area 136 overlaps with the criteria area 130, the corresponding access point 126 is not a DAP since the service area 136 is completely surrounded by DAP service areas 132, 134.

Figure 1D:
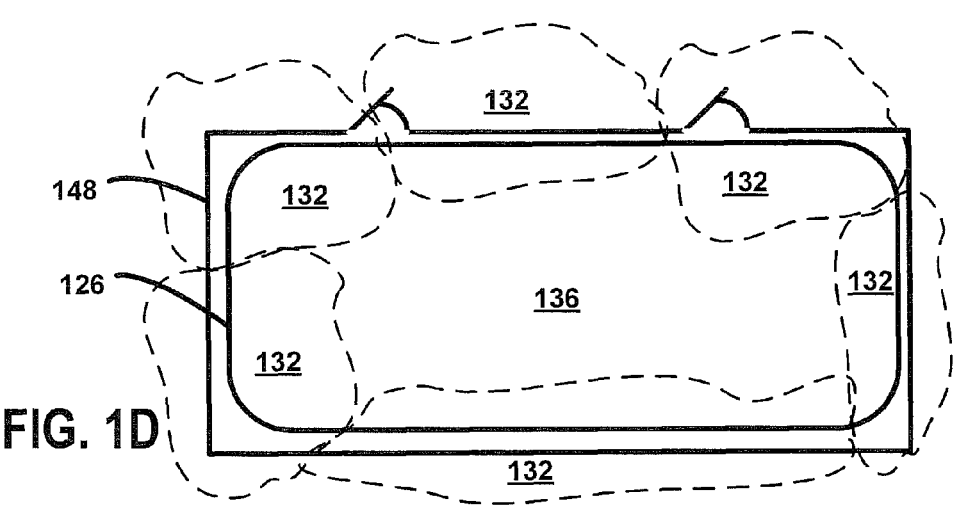
FIG. 1D is a block diagram of a mesh network service area where WLAN service is provided within a building.

FIG. 1D is a block diagram of a mesh network service area 126 where WLAN service is provided within a building 148. In the example illustrated in FIG. 1D, the criteria area 126 is mimics the outer walls of the building 148. Such a criteria area may be advantageous where it is desired to have all dual mode users within the building utilize the mesh network communication system 102 and not the WWAN system 104. Such a requirement may be useful for security reasons. Several DAP service areas 132 are positioned along the perimeter of the building 148 such that any communication device 110 entering the building 148 is detected by a DAP 112.

Figure 1E:
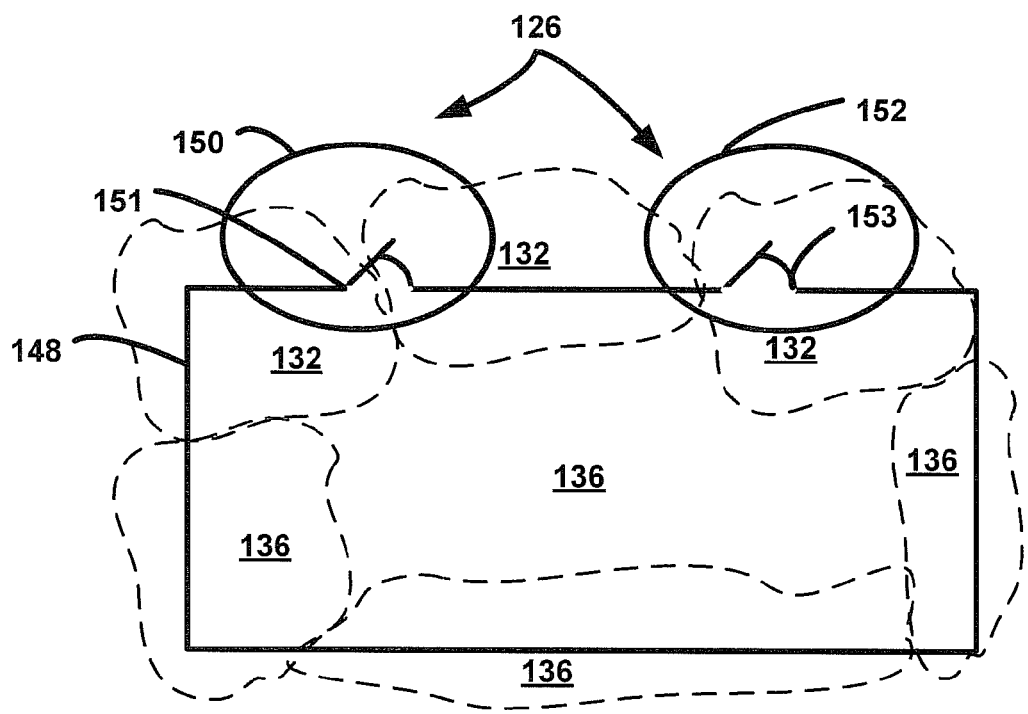
FIG. 1E is a block diagram of a mesh network service area within a building where the criteria area includes two portions.

FIG. 1E is a block diagram of a mesh network service area 128 within a building 148 where the criteria area 126 includes two portions 150, 152. In the example illustrated in FIG. 1E, the first criteria area portion 150 is positioned near a first entrance 154 and a second criteria area portion 152 is positioned near a second entrance 156. The portioned criteria area 126 provides a mechanism of detecting communication devices 110 that are near the entrances 154, 156. Accordingly, the WLAN controller 106 is no bombarded with RL information 116 from access points detecting RL WWAN signals transmitted from communication devices 110 near the building 148 but not likely to enter the building 148 since they are not near an entrance 154, 156.

In some situations, the WLAN controller 106 dynamically assigns the access points to operate as DAPs 112 or as NDAPs 120. The following example of dynamic DAP assignment is discussed with reference to FIG. 1E. For this example, the entrances 151, 153 of the building 148 are used at different times. For example, one entrance 150 is the only entrance open during the certain early hours and the other entrance 153 is opened later in the day. Therefore, communication devices 110 can only enter through the first entrance 151 during the early hours and can enter the building 148 through both entrances 151, 153 later in the day. Based on the entrance schedule, the WLAN controller 106 assigns the criteria area 126 only to the first portion 150 of the criteria area during the early hours and assigns both portions 150, 152 of the criteria during the later hours in the day when both entrances are open. Accordingly, the WLAN controller will only receive RL information from the two DAPs providing the DAP services areas near the first entrance during the early hours. Such a scenario is only one of numerous situations where a dynamic assignment of DAPs may be useful and other criteria can be used to determine which access points are assigned as DAPs.

Figure 1F:
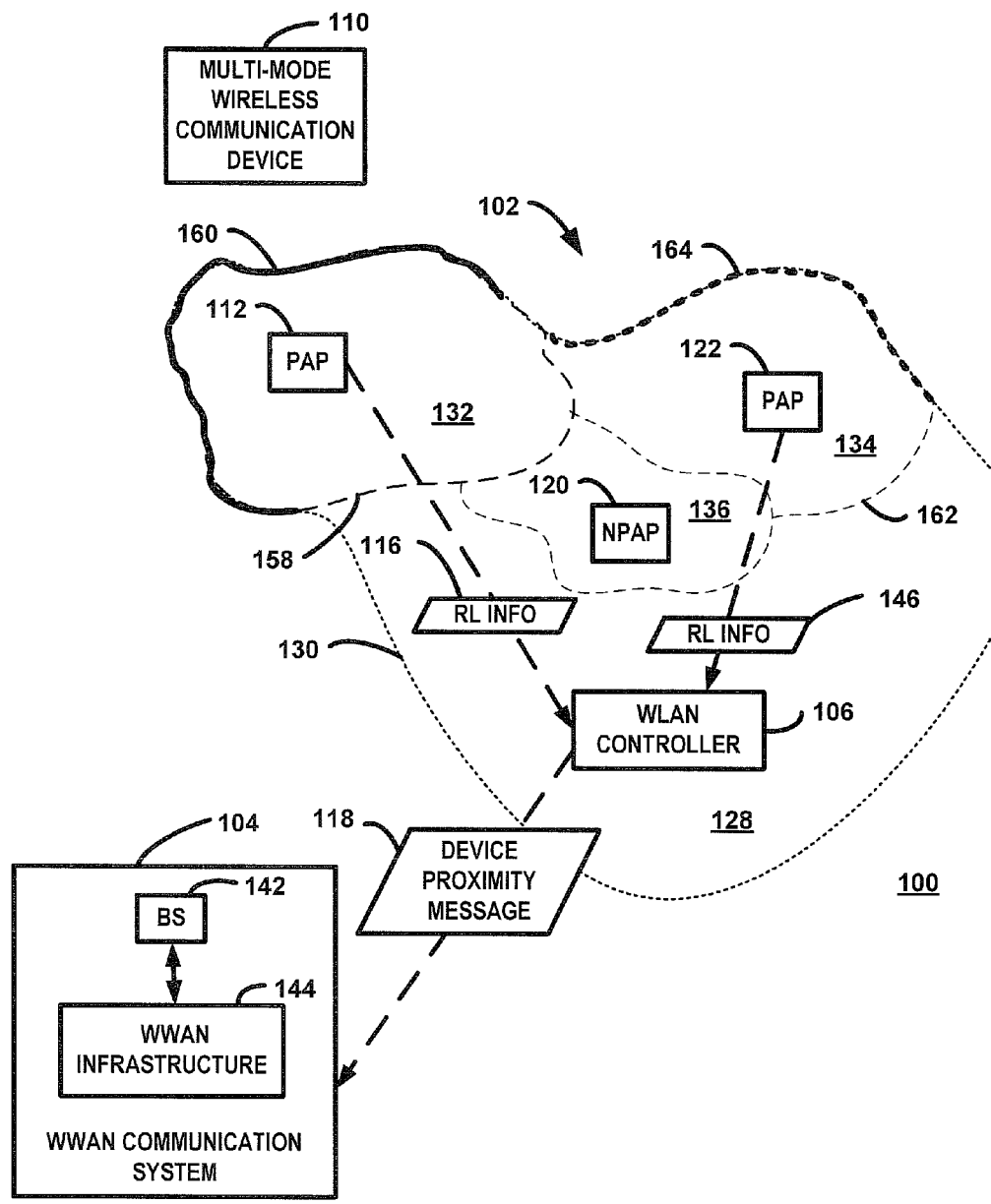
FIG. 1F is a block diagram of a mesh network communication system where the criteria area coincides with the mesh network service area.

FIG. 1F is a block diagram of a mesh network communication system 102 where the criteria area 126 coincides with the mesh network service area 128. The mesh network communication system 102 provides wireless local area network (WLAN) service within the mesh network service area 126 defined by a message network perimeter 130. Access points 112, 122, 120, 124 provide WLAN service within WLAN service areas within the mesh network service area to collectively form the mesh network service area 126. The access points include at least one DAP 112 that is a peripheral access point (PAP) 112 that provides WLAN service within a peripheral service area 132 and at least one NDAP 120 that is a non-peripheral access point 120 for providing WLAN service within a non-peripheral service area 136. FIG. 1 shows one other peripheral access point 122 providing WLAN service within a peripheral service area 134. Accordingly, for the example illustrated in FIG. 1F, the DAPs are PAPs, and the NDAPs are NPAPs. The peripheral service area 132 is defined by a peripheral perimeter 158 that includes at least a portion 160 that forms at least a portion of the mesh network perimeter 130. The portion 160 is illustrated as a solid line in FIG. 1F. The peripheral service area 134 of the other peripheral access point 122 is defined by a peripheral perimeter 162 that includes at least a portion 164 that forms at least a portion of the mesh network perimeter 130. The portion 164 is illustrated as a bold dashed line in FIG. 1F. Only three access points 110, 112, 118 are shown in FIG. 1 in the interest of brevity and clarity. Additional peripheral and non-peripheral access points not shown in FIG. 1F provide WLAN service areas to complete the mesh network service area 104.

When the WWAN communication system 104 is providing wireless communication services to the communication device 110, the peripheral access points 112, 122, at least periodically, monitor the WWAN reverse link channel used by the communication device 110 to transmit WWAN reverse link signals. In some cases, the access points 112, 122 may employ procedures to detect multiple multi-mode communication devices 110. Based on the WWAN reverse link signal received at the peripheral access point 112, 122, the peripheral access point 112, 122 transmits the RL signal information 116, 146 to the WLAN controller 106. Based on the RL signal information, 116, 146 the WLAN controller 106 determines if the communication device 110 should at least search for WLAN service. In some circumstances, the WLAN controller 106 determines that the mesh network 102 should provide WLAN communication service to the communication device 110. When the WLAN determines that the communication device 110 is within range of an access point, the WLAN controller 106 transmits the device proximity message 118 to the WWAN communication system 104 indicating that the communication device 110 is likely within the mesh network service area 126. The WWAN system 104 then performs the WLAN acquisition procedure which may include an instruction for the communication device 110 to search for WLAN service, to search for a particular access point 112, 122 and/or to acquire WLAN service.

Figure 2:
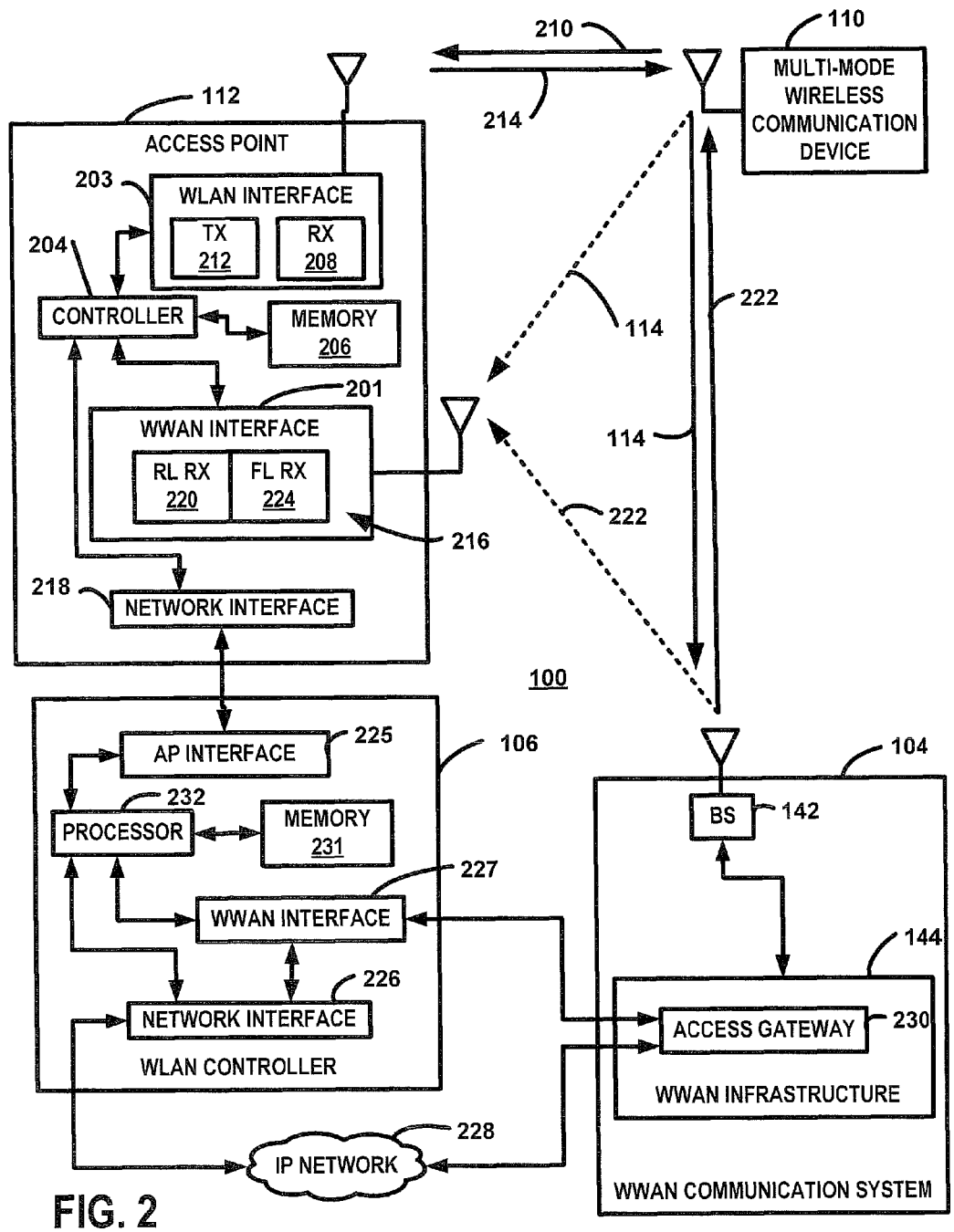
FIG. 2 is a block diagram of the communication network arrangement where the access point receives reverse link WWAN signals from the communication device.

FIG. 2 is a block diagram of the communication network arrangement 100 where a DAP access point 112 receives reverse link (RL) WWAN signals 114 from the communication device 110. The DAP access point 112 includes a WWAN interface 201 for communicating with the WWAN system 104 and the WLAN interface 203 for providing WLAN service to one or more communication devices such as the multi-mode wireless communication device 110. The DAP access point 112 further comprises a controller 204 coupled to the WWAN interface 201 and the WLAN interface 203. The controller 204 performs the control functions described herein as well as performing other functions and facilitating the overall operation of the DAP access point 112. The controller 204 is connected to or includes a memory 206 that may include one or more RAM and or ROM memory devices. The WLAN interface 203 includes a WLAN receiver 208 for receiving reverse link WLAN signals 210 and a WLAN transmitter 212 for transmitting WLAN signals 214. The signals 210, 212 are transmitted and received in accordance with a WLAN protocol. Examples of a suitable WLAN protocols include protocols in accordance with the IEEE 802.11 protocol and wireless fidelity (WiFi). In some circumstances, the access point 102 may also include a wired LAN interface (not shown) for communicating with devices connected to the access point 102 through wires.

A WWAN interface 201 includes any combination of hardware, software and/or firmware adequate to at least detect WWAN RL signals 114. In the exemplary embodiment, the WWAN interface 201 includes a WWAN receiver 216 that can be configured to receive reverse link WWAN signals 114 transmitted from a multi-mode wireless communication device 110. In the exemplary embodiment, the WWAN receiver 216 can be configured as a reverse link WWAN receiver 220 for receiving reverse link WWAN signals 114 and as a forward link WWAN receiver 224 for receiving WWAN forward link signals 222 from a base station 142. In some circumstances, two separate WWAN receivers may be used to implement the WWAN reverse link and forward link receivers 220, 224. The forward link receiver 224 is used to obtain reverse link control information such as reverser link scheduling information transmitted by the base station. Also, in some implementations, the capability to receive WWAN forward link signals 222 may be omitted. In some situations at least some WWAN reverse link control information may be received by the WLAN controller 106 through a wired link from the WWAN system 104 and forwarded to the DAP 112.

The network interface 218 exchanges messages with an access point (AP) interface 225 in the WLAN controller 106. In the exemplary embodiment, the backhaul 108 is a wireless backhaul operating in accordance with 802.11(a) standards and the network interface 218 and the AP interface 225 are 802.11(a) transceivers. In some cases, the backhaul 108 may include a packet switched wired network such as the Internet, microwave point-to-point link, fiber optic cable, or other wired or wireless communication media.

In addition to other information, the memory 206 stores communication device identification values corresponding to each communication device 110 that is authorized to use the mesh network communication system 102. The communication device identification value may include an electronic serial number (ESN) or other unique data. The identification values may be stored at the access point 112 using any of numerous techniques. An example of a suitable method of storing the values includes storing the values during an initialization procedure performed when the access point 112 is installed. In some implementations, the identification values may be omitted or the access point 112 may allow communication devices that do not have corresponding identification values stored at the access point 112 to receive WLAN service from the mesh network 102.

The access point 112 monitors the reverse link WWAN channel(s) that may contain a reverse link WWAN signal 114 transmitted from a communication device 110 that is not currently receiving WLAN service from the mesh network 102. The reverse link WWAN receiver 220 is tuned, or otherwise configured, to receive the reverse link WWAN signals 114. Based on one or more received WWAN RL signals 114, the controller 204 generates a RL information message 116. The RL information 116 includes information that allows the WLAN controller 106 to calculate, or at least estimate, the proximity of the communication device 110 to the DAP access point 112. In the exemplary embodiment, the RL signal information includes the power level and timing information of the received RL WWAN signal. In the exemplary embodiment, the reception time, transmission time and received power level of the received RL WWAN signal 114 are included in the RL information. An example of a suitable format for the timing information includes a time offset indicating a difference between a reference point in the RL signal and a time reference. In some circumstances, the timing offset may be a time difference between a reception time of the signal and a transmission time of the signal, where the transmission time is provided by the WLAN controller 106 or determined by the access point 112 by intercepting RL control information transmitted on the forward link by the base station 142. In some circumstances, the controller 204 may calculate or estimate the proximity of the communication device 110 to the access point 112. The RL information 116, therefore, may be the proximity of the communication device 110 to the access point 112 in some circumstances.

The WLAN controller 106 manages system level functions of the mesh network communication system 102 and includes any combination of hardware, software and/or firmware for performing the management functions discussed herein as well as facilitating the overall functionality of the mesh network. The various functions and operations of the blocks described with reference to the WLAN controller 106 may be implemented using any number of devices, circuits, or elements. Two or more of the functional blocks may be integrated in a single device and the functions described as performed in any single block may be implemented over several devices. For example, at least some of the functions of the WWAN interface 227 may be performed by the network interface 226. The WLAN controller includes the AP interface 225 for communicating with the access points 112, 120, 122, 124 and a network interface 226 for connecting to an internet protocol (IP) network 228. A WWAN interface 229 exchanges message with an access gateway 230 in the WWAN communication system 104 the. In some circumstances, the WWAN interface 229 may communicate with the WWAN system 104 through the IP network 228. The network interface 226, therefore, provides packet data communications and facilitates access to the Internet and to the access gateway 230 in the WWAN infrastructure 144.

In addition to other information, the memory 231 stores communication device identification values corresponding to each communication device 110 that is authorized to use the mesh network communication system 102. The communication device identification value may include an electronic serial number (ESN) or other unique data. The identification values may be stored at the access point 112 using any of numerous techniques. An example of a suitable method of storing the values includes storing the values during an initialization procedure performed when a new communication device is enabled. In some implementations, the identification values may be omitted or the mesh network 102 may allow communication devices that do not have corresponding identification values stored at the WLAN controller 106 to receive WLAN service from the mesh network 102.

The WLAN controller 106 receives the RL information 116 from the DAP 112 through the AP interface 225. In some situations, the WLAN interface may receive other RL information 146 from another DAP 122 where the other RL information 146 is based on a RL WWAN signal transmitted by the same communication device 110 associated with the RL information 116 and, possibly, related to the same RL WWAN signal 114. A processor 232 determines the proximity of the communication device 110 to the DAP 112 based on the RL information 116. Where other RL information 146 is received from other DAPs 122, the processor 232 determines the proximity of the communication device 110 to the other DAPs 122. In some circumstances, the processor 232 may determine the proximity to the one of the DAPs 112 based on RL information 146 received from one or more other DAPS 122.

In the exemplary embodiment, the proximity is used to determine whether the communication device 110 is within range of one or more access points 112, 122 and able to receive WLAN service from the mesh network communication system 102. The processor 232 in the WLAN controller 106 may determine whether to generate and send the device proximity message 118 based on factors other than power level and timing. For example, factors may include only the power level of the WWAN RL signal or on a factor based solely on the WWAN RL receiver's 220 ability to decode the incoming RL signal. The device proximity message 118 initiates a WLAN network acquisition procedure that may result in an attempt by the communication device 110 to acquire wireless service from the access point 112 in the exemplary embodiment. The determination to generate the device proximity message 118, therefore, may be based on other criteria in addition to the proximity. Any of numerous criteria may be used to determine if WLAN service should be acquired where the criteria may include conditions related to the capacity of the access point 112, the capacity of the mesh network communication network 102 and/or the requirements of the communication device 110. The processor 232 uses the WWAN RL signal to determine if the communication device 110 is within a DAP service area 132, 134 and the mesh network service area 126. The criteria used to determine whether the communication device 110 is within a WLAN service area of an access point 112 depends on the type of WWAN.

Any of several techniques may be used to determine the proximity of the communication device 110 based on the WWAN RL signal. In the exemplary embodiment discussed below in further detail, a forward link WWAN signal transmitted from the base station to the communication device 110 is intercepted by one of the access points 112, 122 and decoded to determine power level information. The information is forwarded to the WLAN controller 106 where based on the difference in received power and transmitted power of the WWAN RL signal and the signal propagation time, the WLAN controller 106 determines the distance between the communication device 110 and the access point 112 receiving the WWAN RL signal 114. The WLAN controller 106 may also determine distance based only on the difference between the arrival time and transmission time of the WWAN RL signal in some circumstances. In another example, the WLAN controller 106 may determine that the communication device 110 is sufficiently close to generate the device proximity message 118 if the received power level is above a threshold without information regarding the transmission power level. Another example of a suitable technique of determining proximity includes utilizing multiple antennas or smart antennas to determine the proximity of the communication device 110 to the access point 112 based on the reverse link WWAN signal transmitted by the communication device 110. For example, beam forming antennas may provide distance information to allow the controller to determine whether the communication device 110 is within the WLAN service area. Further, the WLAN controller may use timing and/or power information received from other access points 122 to determine the proximity to the DAP 112. Other techniques or combinations of techniques may be used.

In the exemplary embodiment, the WWAN infrastructure 144 comprises a packet switched core network that includes at least one access gateway 230. The WWAN interface 227 and the network interface 226 may be connected to the access gateway 230 using any combination of wired and wireless connections. Examples of suitable connections include T1 lines, fiber optic cable, coaxial cable, and point-to-point microwave. The access gateway 230 is a communication interface that allows the WLAN controller 106 to communicate with the WWAN infrastructure 144.

During operation, information regarding the power level is determined by intercepting the WWAN FL signals that contains power control information corresponding to each communication device 110. In the exemplary embodiment, information is extracted from the UL MAP transmitted in the WWAN FL signal. The controller processor 232 maintains a current power level of each communication device associated with each stored identification value. In some situations, other information may be required to determine the transmission power of the reverse link WWAN signal. Also, signal timing information may be extracted from the forward link WWAN signal which may be used to calculate a WWAN RL signal propagation time of the WWAN RL signal and, therefore, the proximity of the communication device 110. In some situations, a combination of propagation time, propagation loss and other parameters may be used to determine the proximity.

After determining the proximity of the communication device 110 to the access point 112, the processor 232 determines whether any of the access points 112, 122 should provide WLAN service to the communication device 110. If the processor 232 determines that an access point 110 should provide WLAN service to the communication device 110, the processor 232 generates a device proximity message 118. The message 118 is sent to the WWAN communication system 104 either through the WWAN interface 227 or through the network interface 226 and the IP network 228.

The device proximity message 118 includes at least information identifying the communication device 110 that results in an interpretation by the WWAN infrastructure 136 that WLAN service may be available to the communication device 110. The device proximity message 140, however, may include additional information such, for example, information identifying the WLAN controller 106, the calculated or estimated proximity of the communication device 110 to the access points 110, 112, and available capacity on an access point 110, 112 or the mesh network 102. Access point identification information may include a SSID of the access point 102. Further, the device proximity message 118 may contain security protocol that assists the core network in identifying the WLAN controller 106. The WWAN infrastructure may perform additional analysis to determine what instructions, if any, will be sent to the communication device 110. In some situations, the WWAN infrastructure (core network) 144 sends an instruction to the communication device 110 indicating that the communication device 110 should search for a WLAN system. In response to the instruction, the communication device 110 activates and tunes the WLAN interface to search for a WLAN signal in accordance with known techniques. In other situations, the WWAN infrastructure (core network) 144 sends an instruction to the communication device 110 indicating that the communication device 110 should search for the specific access point 112 that indicated by the WLAN controller 106 and sent in the device proximity message 140. In other situations, the WWAN infrastructure (core network) 144 may instruct the communication device 110 to acquire WLAN service.

Figure 3:
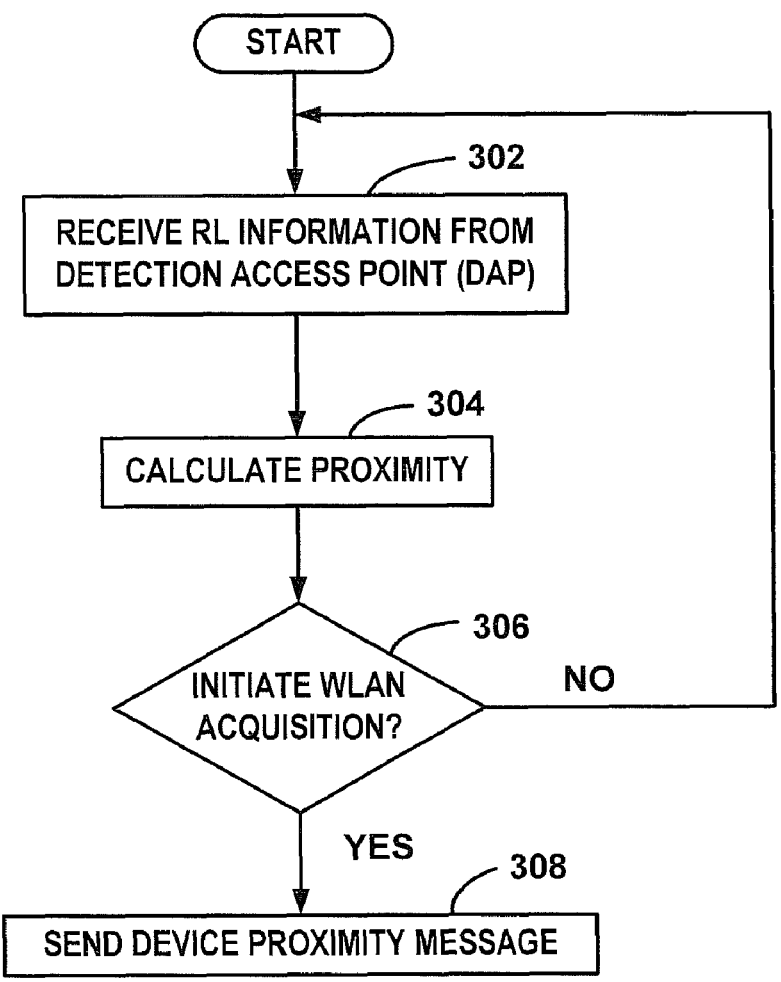
FIG. 3 is a flow chart of a method of managing wireless service to a multi-mode wireless communication device performed in a WLAN controller in accordance with the exemplary embodiment.

FIG. 3 is flow chart of a method of managing wireless service to a multi-mode wireless communication device 110 performed in a WLAN controller 106 in accordance with the exemplary embodiment. The method may be performed by any combination of hardware, software and/or firmware. The order of the steps discussed below may be varied and one or more steps may be performed simultaneously in some circumstances. In the exemplary embodiment, the method is performed, at least in part, by executing code on the processor 232 in the WLAN controller 106.

At step 302, reverse link (RL) information 116 (146) is received from one or more DAPs 110 (112). The access point interface 225 receives and decodes the signals transmitted by the peripheral access points 112 (146) that include the RL information 116 (146). The RL information 116 is forwarded to the processor 232 and includes signal timing and power information in the exemplary embodiment.

At step 304, the proximity of the communication device 110 to at least one DAP 112 is calculated. In the exemplary embodiment, the proximity of the communication device to each DAP 110, 112 providing RL information 116, 146 is calculated. RL information 146 provided by one DAP 122 may be used to calculate the proximity of the communication device 110 to another DAP 112. The proximity calculation may be based on any number of parameters or characteristics of the received WWAN RL signal as well as other factors. Examples of suitable RL information parameters include parameters related to signal power level and a timing offset between a transmission and reception times at a DAP 112. Other related factors may include transmission power level, location of one or more WWAN base stations and information extracted from WWAN RL signals and WWAN FL signals such as time stamps, power level indicators, and power control indicators. The particular factors and calculation techniques depend on the type of WWAN communication system 104. An exemplary technique of acquiring RL information at a DAP 112 suitable for an OFDM based system IEEE 802.16 is discussed with reference to FIG. 6 below.

At step 306, it is determined whether the communication device 110 should acquire WLAN service. Although the determination may be based solely on the proximity of the communication device 110 to a DAP 112, 122 other factors may be considered in some circumstances. Examples of other factors include the capacity of the access point 110, capacity of the mesh network, the required bandwidth required by the communication device 110, the current cost of the WWAN service, and the estimated motion of the communication device. If the processor 232 determines that WLAN service should be acquired, the method continues at step 308, otherwise, the method returns to step 302. In some circumstances, step 306 can be omitted.

At step 308, a device proximity message 118 is sent to the WWAN communication system 104. In the exemplary embodiment, the message 118 is transmitted by the WWAN interface 227 through either the IP network 228 using the network interface 226 or through a backhaul connection to the access gateway 230 in the WWAN communication system 104. As discussed above, the device proximity message 118 at least indicates that the communication device 110 may be within range of an access point 112, 122 although other indications and information may be included. The WLAN controller 106 may transmit the message using other techniques. In some circumstances, for example, the message 140 may be transmitted through a WWAN RL channel to the base station 134. The WWAN system 104 may initiate acquisition, of the WLAN service, initiate searching for WLAN service or may initiate a handoff to the access point 110.

Figure 4:
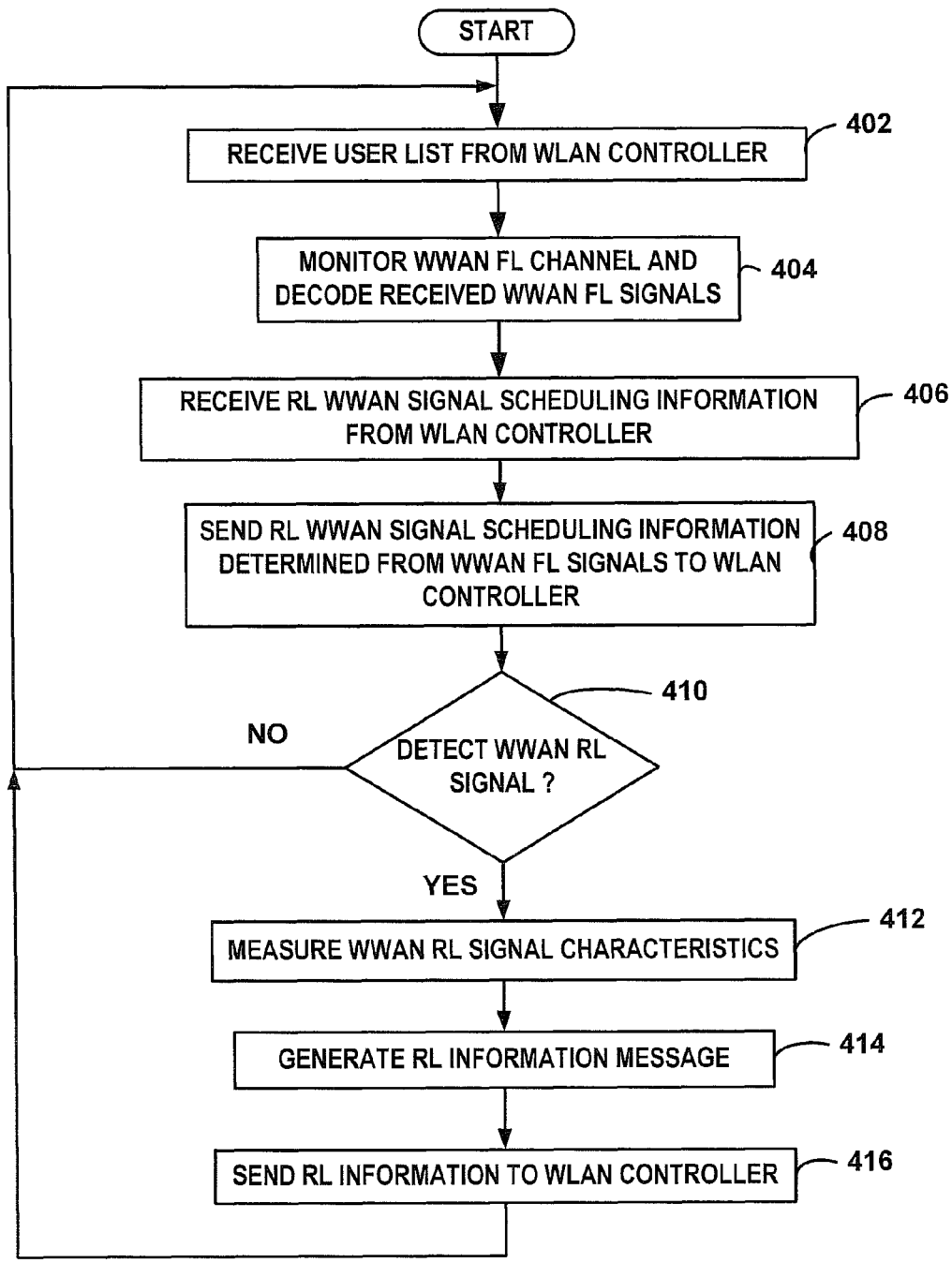
FIG. 4 is a flow chart of a method of performed in a peripheral access point in accordance with the exemplary embodiment.

FIG. 4 is a flow chart of a method of managing wireless service to a multi-mode wireless communication device 110 performed in a DAP 112 in accordance with the exemplary embodiment. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 204 in the DAP 112.

At step 402, the DAP 112 receives a user list from the WLAN controller 106. The access point 110 maintains the user list in memory 206. Changes to the user list are contained in the messages transmitted from the WLAN controller 106 to the access point 112 through the backhaul 108. In some circumstances, a new user list may be transmitted while in other circumstances only changes to the user list may be sent. The messages are sent in accordance with any protocol and technique suitable for communication between the WLAN controller 106 and the DAPs 112, 122 through the backhaul 108.

At step 404, the DAP 112 monitors the WWAN FL channel and decodes received WWAN FL signals 222. The forward link (FL) receiver 224 is tuned to FL channels that may contain FL signals transmitted from a base station to any of the communication devices contained in the user list. Intercepted FL signals are decoded an evaluated to determine reverse link scheduling information. In some situations, at least some of the information within the FL signals may be received at the WLAN controller 106 through a wired link and forwarded to the DAP 112.

At step 406, reverse link scheduling information determined by other access points is received from the WLAN controller 106. If reverse link scheduling information has been acquired by other access points 112 and forwarded to the WLAN controller 106, the WLAN controller 106 forwards the reverse link scheduling information to all other DAPs. The DAP 112 stores the information with the associated communication device in the user list in memory 206.

At step 408, the DAP 112 sends reverse link scheduling information extracted from the FL WWAN signals to the WLAN controller 106. The controller 204 compares stored scheduling information, if any, to the scheduling information obtained from the FL WWAN signals and sends the scheduling information to the WLAN controller 106 if the new scheduling information is different from stored information.

At step 410, the WWAN reverse link (RL) channel is monitored and it is determined whether a WWAN RL signal has been received at the DAP 112. The RL WWAN receiver 220 in the WWAN interface at least periodically monitors the WWAN reverse link (RL) channel. In the exemplary embodiment, the WWAN RL receiver 220 is tuned to decode any WWAN RL signals 202 transmitted from any of the communication devices 110 in the user list. The DAP 112 may detect communication devices 110 that are not in the user list but will not be able to decode the signals without identification information. In some circumstances, however, the WWAN RL receiver 220 may be configured to monitor all RL channels. If a WWAN RL signal has been received, the method continues at step 412. Otherwise, the method returns to step 402.

At step 412, the characteristics of the received WWAN RL signal 114 is measured. In the exemplary embodiment, the reception time and power level of the received signal are measured and stored. Other signal characteristics can also be measured. An example of another characteristic includes a signal to noise measurement.

At step 414 a RL information message 116 is generated. One or more RL WWAN signal characteristics are associated with an identifier of the corresponding communication device and formatted within a message suitable for transmission through the backhaul to the WLAN controller 106. In the exemplary embodiment, the signal reception time and the signal power level is formatted within the RL information message 116.

At step 416, the RL information is sent to the WLAN controller 106. The WLAN controller transmits the RL information message through the network interface 218 connected to the backhaul. The RL information message 116 is received by the WLAN controller 106 through the AP interface 225. The method returns to step 402 to continue monitoring forward link and reverse link WWAN channels.

Figure 5:
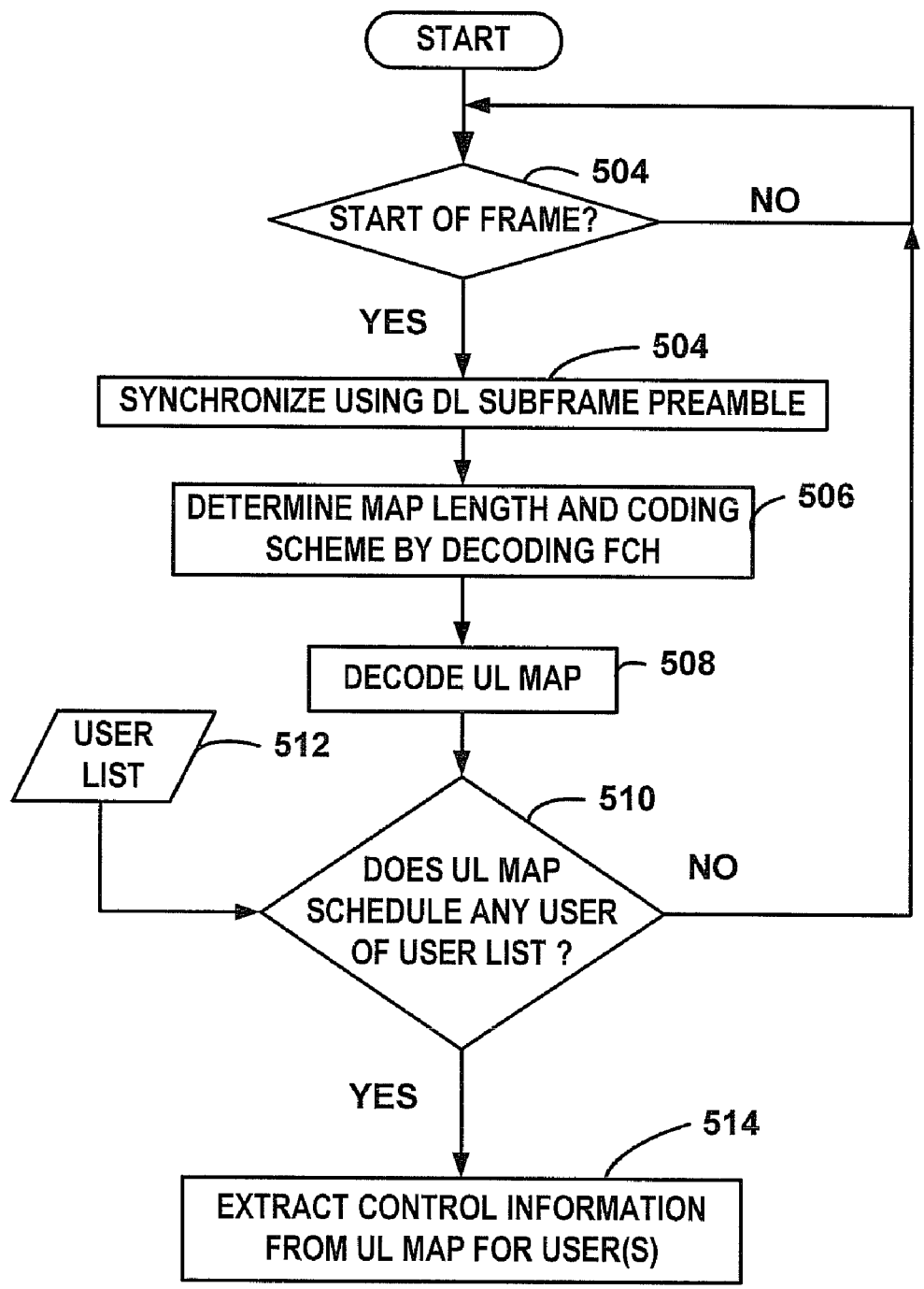
FIG. 5 is a flow chart of a method of monitoring a WWAN FL channel at a peripheral access point where the WWAN system operates in accordance with the IEEE 802.16 standard.

FIG. 5 is a flow chart of a method of monitoring a WWAN FL channel at DAP 112 where the WWAN system 104 operates in accordance with OFDM techniques. The exemplary method operates within an OFDMA system that functions in accordance with IEEE 802.16(e) protocols. The method described with reference to FIG. 5 is an example of suitable technique for acquiring information that allows the DAP 112 to monitor the reverse link WWAN channels. As explained above, some scheduling and identification information may be obtained by the DAP 112 through the WLAN controller 106. As discussed with reference to FIG. 5 and FIG. 6, the forward link (FL) WWAN signal and WWAN FL channels are referred to as downlink (DL) signals and downlink (DL) channels and correspond to communications from an OFDMA base station, sometimes referred to as an access node (AN), to the communication device 110. As discussed with reference to FIG. 5 and FIG. 6, reverse link (RL) WWAN signals and WWAN RL channels are referred to as uplink (UL) signals and uplink (UL) channels and correspond to communications from the communication device 110 to the OFDMA base station. As is known, IEEE 802.16(e) standards (WiMax) can operate in a time division duplex (TDD) or frequency division duplex (FDD) scheme. In the exemplary embodiment, the system operates in TDD mode. Those skilled in the art will readily apply the teachings herein to implement the system in FDD mode. In a TDD mode, each frame is split into a downlink (DL) sub-frame and an uplink (UL) sub-frame. The DL sub-frame includes a preamble, control information and other broadcast messages and packets. The control information includes DL and UL MAPs. Each communication device 110 is assigned a specific set of frequencies for receiving respective data packets. Each communication device 106 is also assigned a set of frequencies for transmitting in the UL.

At step 502, the controller 204 locates the start of a DL frame. When the start of the frame is found, the method continues at step 504. Otherwise, the step 502 is repeated.

At step 504, the WWAN FL receiver 224 acquires and synchronizes to the incoming signal using the DL sub-frame preamble. The WWAN FL receiver 224, therefore, performs the functions of a DL receiver in the exemplary method.

At step 506, the Frame Control Header (FCH) is decoded to determine the DL data burst length and coding scheme. In the exemplary method, the FCH burst is followed by the preamble. In networks operating in accordance with IEEE 802.16 standards, an uplink map (UL MAP) is a Medium Access Control (MAC) message that defines burst start times and frequencies on the UL channels for each communication device 106.

At step 508, the UL MAP is decoded. Accordingly, the received DL signals provides information in the UL MAP that allows the controller 204 to determine the timing of UL signals and carrier frequencies assigned to the communication device 110. In addition, the UL MAP includes user identification (ID) information corresponding to communication devices that are receiving the DL signals from the base station (access node).

At step 510, it is determined whether one or more of the communication devices listed in a user list 512 at the access point 110 are contained in the UL MAP. The user list 512 includes identification information that uniquely identifies communication devices that are supported by the access point 110. For example, the IEEE 802.16(e) standard uses manufacturer-issued X.509 digital certificates to identify devices. In the exemplary embodiment, the user list is provided by the WLAN controller 106 and updated accordingly. The user list 512, however, may be programmed at the time of installation of the DAP 112 and may be modified to add or remove user IDs. If no user IDs in the user list are contained in the UL MAP, the method returns to step 502. Otherwise, the method continues at step 514. In some circumstances, the UL MAP may not contain an explicit identification number and may include indirect identification information that can be used to determine the identity of the communication device 110.

At step 514, the control information for all of identified users is extracted from the UL MAP or other control messages. The control information is the transmission RL control information that includes a RL transmission power level and a RL transmission time for the WWAN RL signals transmitted by the communication devices 110. The timing information corresponding to the identified communication device is extracted from the decoded UL MAP and stored in memory. The control and scheduling information if forwarded to the WLAN controller 106 as described above.

Figure 6:
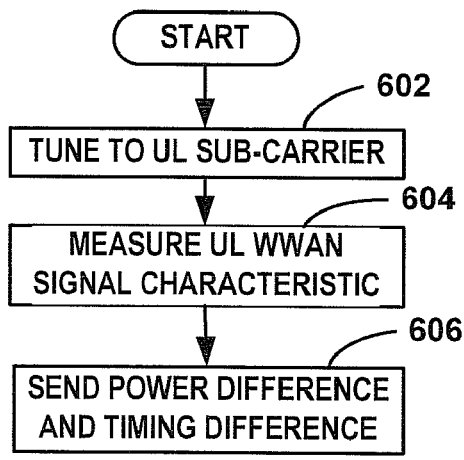
FIG. 6 is a flow chart of an exemplary monitoring a WWAN RL channel where the WWAN system operates in accordance with the IEEE 802.16 standard.

FIG. 6 is a flow chart of an exemplary method of managing wireless resources where the WWAN system 104 operates in accordance with OFDMA based system such as IEEE 802.16 (e). The exemplary method is performed by the DAP 112 and includes monitoring a WWAN RL channel and sending reverse link information 142 to the WLAN controller based on a received WWAN RL signal. As explained above, the WWAN RL signals and WWAN RL channels are referred to as UL signals and UL channels with reference to FIG. 6. Using the information determined with the method discussed with reference to FIG. 5, or the information received from the access gateway 230, the access point 110 monitors the UL WWAN channel and sends the reverse link information 116 to the WLAN controller 106 Accordingly, steps 602-604 provide an exemplary technique for performing steps 404, and 412 discussed with reference to FIG. 4 above.

At step 602, the WWAN receiver 220 is tuned to the UL sub-carrier frequency indicated by the UL map. The UL sub-carrier frequency received from the access gateway or extracted in step 514 is used to tune the WWAN RL receiver 220. In some situations, a single receiver may be tuned to both uplink and downlink frequencies. In the exemplary embodiment, WWAN interface 201 can simultaneously receive UL and DL signals.

At step 604, the characteristics of the received UL WWAN signal are measured. In the exemplary embodiment, the controller 204 determines the power level and the reception time of the received UL signal. In some situations only the reception time or the power level is determined. Using known techniques, the power of the received UL WWAN signal is measured and stored in memory 206. The reception time is determined relative to the system time and stored in memory. Other signal characteristics may be determined in some circumstances where the signal characteristics provide information regarding the proximity of the communication device 110 to the DAP 112 or other DAP 122. In the exemplary embodiment, the identification information is used to identify the communication device 110 only and not to decode the signals in order to minimize cost. In some implementations, however, the identification information may be used to decode the WWAN RL signals.

Figure 7:
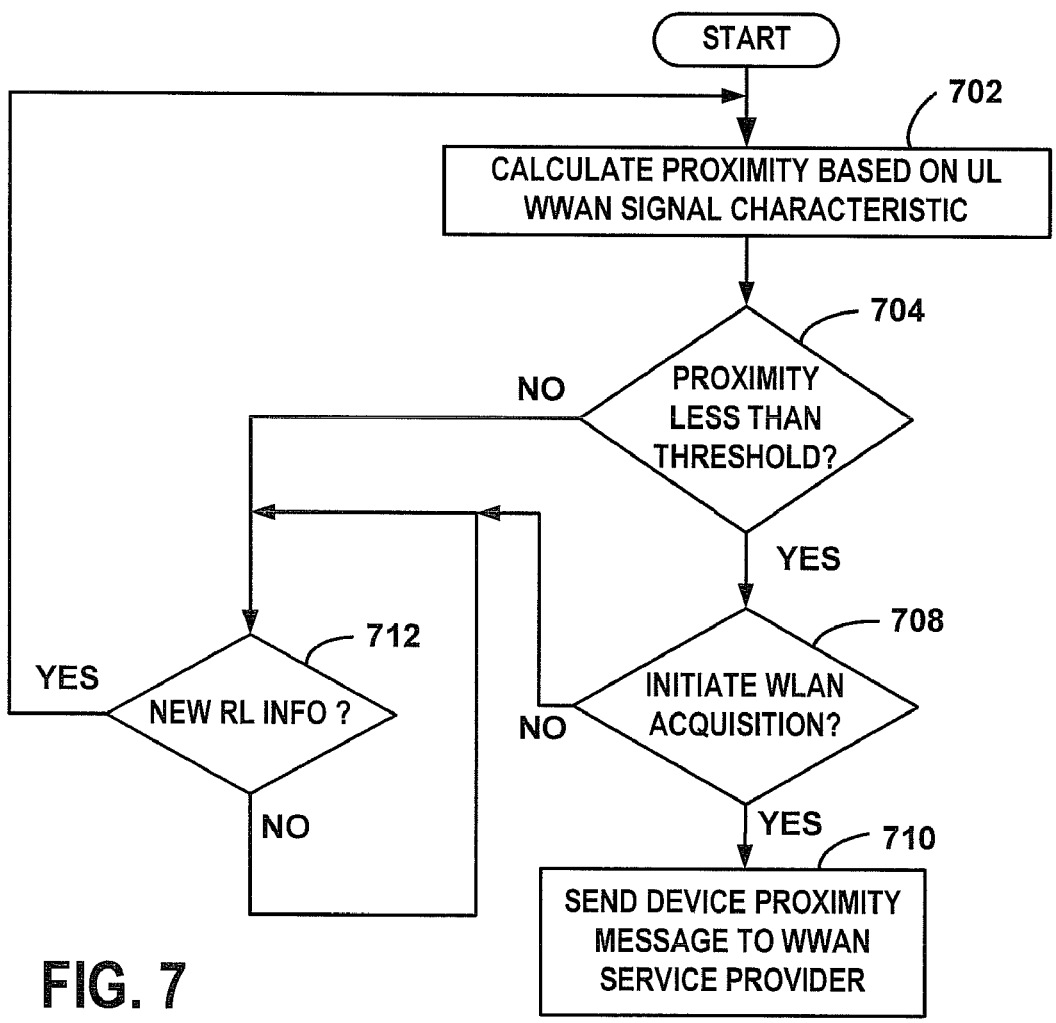
FIG. 7 is a flow chart of a method performed in a WLAN controller where the WWAN system operates in accordance with the IEEE 802.16 standard.

FIG. 7 is a flow chart of an exemplary method of managing wireless resources performed in a WLAN controller 106 where the WWAN system 104 operates in accordance with OFDMA based system such as IEEE 802.16(e) The exemplary method includes using the RL information received from the DAPs 112, 122 to determine whether WLAN service should be acquired by the communication device 110.

At step 702, the WLAN controller 106 calculates the proximity of the communication device 110 based on RL information 116, 146 received from one or more DAPs 112, 122. Based on the characteristics of the UL signal, the processor 232 determines the distance from the access point 112 to the communication device 110. Using the transmission time of the WWAN UL signal determined from the UL MAP and reception time, the processor 232 calculates a propagation time of the signal. The propagation attenuation of the signals is determined by calculating the difference between the transmission power and the reception power. Using either or both of the propagation parameters, the processor 232 calculates the proximity of the communication device 110 to the access point 112. For example, the distance may be determined by multiplying the propagation time by the speed of light. The distance may also be calculated by comparing the propagation loss to a known propagation loss per distance function for the antennas. The distance values may be averaged or otherwise processed to determine the proximity. Further, the processor 232 may use RL information 146 received from other access points 112 to determine the proximity to the access point 112 and/or other DAPs 122.

At step 704, it is determined whether the proximity of the communication device 110 to the DAP 112 is less than a threshold. The threshold may be based on any of several factors and may be dynamic or static. In the exemplary embodiment, the threshold is the maximum distance between the communication device 110 and the DAP 112 where the DAP 112 can provide WLAN service to the communication device 110. If the proximity is less than the threshold, the method continues at step 708. Otherwise, the method continues to step 712 where the procedure includes returning to step 702 when new RL information is received.

At step 708, it is determined whether the communication device 110 should acquire WLAN service. Although the determination may be based solely on the proximity of the communication device 110 to the DAP 112, other factors may be considered in some circumstances. Examples of other factors include the capacity of the DAP 112, the capacity of the mesh network communication system 102, the required bandwidth required by the communication device 110, the current cost of the WWAN service, and the estimated motion of the communication device 110. If the controller determines that WLAN service should be acquired, the method continues at step 710, otherwise, the method proceeds to step 712. In some situations, this step can be omitted and the WLAN controller 106 may send proximity information to the WWAN system 104 where the WWAN system 104 determines whether the communication device 110 should acquire WLAN service.

At step 710, a device proximity message 118 is sent to the WWAN service provider. The message includes information that when interpreted by the WWAN results in instruction from the WWAN system 104 to the communication device 110 resulting in the search for the DAP 112 or other access points in the mesh network. In some circumstances the acquisition may result in a handoff from the WWAN system to the WLAN system. In other circumstances, service may be maintained from the WWAN system 104 or the communication device 110 may remain registered on the WWAN system 104 although no user data is transmitted over the WWAN communication channels.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A mesh network communication system for providing wireless local area network (WLAN) service within a mesh network service area, the mesh network communication system comprising:
   a plurality of access points configured to provide WLAN service within the mesh network communication system, the plurality of access points comprising a detection access point (DAP) configured to detect a reverse link wireless wide area network (WWAN) signal transmitted by a multi-mode wireless communication device and a non-detection access point (NDAP) configured, at least temporarily, not to transmit any reverse link information related to any WWAN signals transmitted from any multi-mode wireless device; and
   a WLAN controller connected to the plurality of access points through a backhaul and configured to receive, through the backhaul, reverse link information related to the reverse link WWAN signal transmitted by the multi-mode wireless communication device and received at the DAP.

2. The mesh network communication system of claim 1, wherein the DAP is configured to provide WLAN service within a DAP service area having at least a portion that overlaps with a criteria area having a criteria area perimeter, the NDAP configured to provide WLAN service within a NDAP service area, wherein no portion of the NDAP service area is closer to the criteria area perimeter than any portion of the DAP service area.

3. The mesh network communication system of claim 1, wherein the DAP is configured to provide WLAN service within a DAP service area having at least a portion that overlaps with a criteria area having a criteria area perimeter, the DAP service area having a DAP service area perimeter, the DAP service area perimeter including at least a portion that is closer to the criteria area perimeter than any portion of any other perimeter of any other access point service area that at least partially overlaps the criteria area.

4. The mesh network communication system of claim 1, wherein the WLAN controller is further configured to send a device proximity message to a WWAN communication system, the device proximity message based on proximity of the multi-mode wireless communication device to the DAP.

5. The mesh network communication system of claim 4, wherein the WLAN controller is further configured to generate the device proximity message based on the reverse link information.

6. The mesh network communication system of claim 4, wherein the device proximity message comprises a request to establish wireless service to the multi-mode wireless communication device from the mesh network communication system.

7. The mesh network communication system of claim 4, further comprising:
   another detection access point (DAP) configured to provide WLAN service within another DAP service area and configured to detect the reverse link WWAN signal, the WLAN controller further configured to receive other reverse link information related to the reverse link WWAN signal received at the another DAP, wherein the device proximity message is further based on the other reverse link information.

8. The mesh network communication system of claim 4, wherein the WLAN controller is further configured to generate the device proximity message when the proximity is below a WLAN proximity threshold.

9. The mesh network communication system of claim 4, wherein the DAP comprises a WWAN reverse link receiver configured to receive the WWAN reverse link signal transmitted from the multi-mode communication device.

10. The mesh network communication system of claim 9, wherein the WLAN controller is further configured to generate the device proximity message based on a received power level of the WWAN signal at the DAP.

11. The mesh network communication system of claim 10, wherein the DAP further comprises a forward link WWAN receiver configured to receive a forward link WWAN signal comprising control data for the multi-mode wireless communication device, the WLAN controller further configured to generate the device proximity message based, at least partially, on the control data and the received power level of the WWAN signal.

12. The mesh network communication system of claim 4, further comprising a non-detection access point (NDAP) configured to provide WLAN service within a NDAP service area surrounded by one or more peripheral service areas.

13. The mesh network communication system of claim 4, wherein the WLAN controller is configured to dynamically configure at least one of the plurality of access points to operate and as a DAP.

14. The mesh network communication system of claim 13, further comprising a plurality of DAPs of the plurality of access points, the WLAN controller configured to dynamically configure the DAPs to enable transmission of reverse link information.

15. The mesh network communication system of claim 14, the WLAN controller further configured to dynamically configure each DAP to enable reception of reverse link WWAN signals.

16. The mesh network communication system of claim 1, wherein the WLAN controller is an access point.

17. A wireless local area network (WLAN) controller configured to communicate with a plurality of access points to form a mesh network providing WLAN service within a mesh network service area, the WLAN controller comprising:
   an access point interface configured to receive reverse link information related to a reverse link wireless wide area network (WWAN) signal received at a detection access point (DAP) providing WLAN service within a DAP service area, the DAP configured to detect the reverse link wireless wide area network (WWAN) signal transmitted by a multi-mode wireless communication device; and
   a WWAN interface configured to send a device proximity message to a WWAN communication system, the device proximity message based on proximity of the multi-mode wireless communication device to the DAP, wherein the DAP is configured to provide WLAN service within a DAP service area having at least a portion that overlaps with a criteria area having a criteria area perimeter, the DAP service area having a DAP service area perimeter, the DAP service area perimeter including at least a portion that is closer to the criteria area perimeter than any portion of any other perimeter of any other access point service area that at least partially overlaps the criteria area.

18. The WLAN controller of claim 17, wherein the DAP is selected from the plurality of access points based on a relationship to the criteria area.

19. The WLAN controller of claim 18, further comprising a processor for selecting the DAP and generating control information to configure the DAP to transmit the reverse link information.

20. The WLAN controller of claim 17, further comprising:
a processor configured to generate the device proximity message based on the reverse link information.

21. The WLAN controller of claim 20, wherein the device proximity message comprises a request to establish wireless service to the multi-mode wireless communication device from the mesh network communication system.

22. The WLAN controller of claim 20, the access point interface further configured to receive other reverse link information from another detection access point configured to provide WLAN service within another DAP service area, the other reverse link information related to the reverse link WWAN signal received at the another detection access point, wherein the device proximity message is further based on the other information.

23. A mesh network communication system comprising a plurality of wireless local area network (WLAN) access points, each configured to provide WLAN service in a WLAN access point service area within a mesh network service area provided by the mesh network communication system, the plurality of WLAN access points comprising:
a non-detection access point (NDAP) configured to provide WLAN service within a non-detection WLAN service area and configured, at least temporarily, not to transmit any reverse link information related to any wireless wide area network (WWAN) signals transmitted from any multi-mode wireless device; and
a detection access point (DAP) configured to provide wireless local area network (WLAN) service within a DAP service area, the DAP service area having a DAP service area perimeter, the DAP comprising:
a WLAN interface configured to provide the WLAN service within the DAP service area, the DAP service area at least partially overlapping a criteria area having a criteria area perimeter, the DAP service area perimeter including at least a portion that is closer to the criteria area perimeter than any portion of any other perimeter of any other WLAN access point service area provided by the plurality of WLAN access points;
a wireless wide area network (WWAN) reverse link (RL) receiver configured to receive a WWAN RL signal transmitted by a multi-mode wireless communication device capable of communicating in a WWAN and in a WLAN;
a controller configured to determine a RL signal characteristic of the WWAN RL signal; and
a network interface configured to send reverse link signal information based on the RL signal characteristic to a WLAN controller configured to manage the mesh network communication system, the reverse link signal information facilitating a determination by the WLAN controller that the multi-mode wireless communication device is within the criteria area.

24. The mesh network communication system of claim 23, where the reverse link signal information is based on a reverse link signal propagation time.

25. The mesh network communication system of claim 23, where the reverse link signal information is based on a reverse link signal propagation power attenuation.

26. The mesh network communication system of claim 23, further comprising a plurality of DAPs providing a plurality of DAP service areas having DAP service area perimeters, the WLAN service area having a WLAN service area perimeter formed by portions of the DAP service area perimeters.

27. A mesh network communication system for providing wireless local area network (WLAN) service within a mesh network service area, the mesh network communication system comprising:
a plurality of access points configured to provide WLAN service within the mesh network communication system, the plurality of access points comprising a detection access point (DAP) and a non-detection access point (NDAP) configured, at least temporarily, not to transmit any reverse link information related to any wireless wide area network (WWAN) signals transmitted from any multi-mode wireless device, the DAP comprising:
a wireless wide area network (WWAN) receiver configured to receive a reverse link (RL) WWAN signal transmitted by a multi-mode wireless communication device located within a criteria area and
a WLAN network interface configured to transmit reverse link information related to the RL WWAN signal through a backhaul; and
a WLAN controller comprising:
an access point interface connected to the plurality of access points through the backhaul, the access point interface configured to receive the reverse link information;
a processor configured to determine that the multi-mode wireless communication device is located within the criteria area based on the reverse link information and that the multi-mode wireless communication device is located at least near the mesh network service area.

28. The mesh network communication system of claim 27, wherein the DAP service area has at least a portion that overlaps with the criteria area, the criteria area having a criteria area perimeter, wherein no portion of the NDAP service area is closer to the criteria area perimeter than any portion of the DAP service area.

29. The mesh network communication system of claim 27, wherein the WLAN controller is further configured to send a device proximity message to a WWAN communication system, the device proximity message based on proximity of the multi-mode wireless communication device to the access point.

30. A mesh network communication system for providing wireless local area network (WLAN) service within a mesh network service area, the mesh network communication system comprising:
a plurality of access points configured to provide WLAN service within the mesh network communication system, the plurality of access points comprising a plurality of detection access points (DAPs) and a non-detection access point (NDAP) configured, at least temporarily, not to transmit any reverse link information related to any wireless wide area network (WWAN) signals transmitted from any multi-mode wireless device; and
a WLAN controller connected to the plurality of access points through a backhaul and configured to:
dynamically configure at least one of the plurality of access points to operate as a DAP;
dynamically configure the DAPs to enable transmission of reverse link information;
receive reverse link information related to a reverse link (RL) wireless wide area network (WWAN) signal transmitted by a multi-mode wireless communication device and received by at least one of the DAPs; and send a device proximity message to a WWAN communication system, the device proximity message based on proximity of the multi-mode wireless communication device to the DAP.

31. The mesh network communication system of claim 30, wherein the WLAN controller is further configured to generate the device proximity message based on the reverse link information.

32. The mesh network communication system of claim 30, wherein the device proximity message comprises a request to establish wireless service to the multi-mode wireless communication device from the mesh network communication system.

33. The mesh network communication system of claim 30, further comprising:
another detection access point (DAP) configured to provide WLAN service within another DAP service area, the WLAN controller further configured to receive other reverse link information related to the reverse link WWAN signal received at the another DAP, wherein the device proximity message is further based on the other reverse link information.

34. The mesh network communication system of claim 30, wherein the WLAN controller is further configured to generate the device proximity message when the proximity is below a WLAN proximity threshold.

35. The mesh network communication system of claim 30, wherein the DAP comprises a WWAN reverse link receiver configured to receive the WWAN reverse link signal transmitted from the multi-mode communication device.

36. The mesh network communication system of claim 30, the WLAN controller further configured to dynamically configure each DAP to enable reception of reverse link WWAN signals.

37. A wireless local area network (WLAN) controller configured to communicate with a plurality of access points to form a mesh network providing WLAN service within a mesh network service area, the WLAN controller comprising:
an access point interface configured to receive reverse link information related to a reverse link wireless wide area network (WWAN) signal received at a detection access point (DAP) providing WLAN service within a DAP service area;
a WWAN interface configured to send a device proximity message to a WWAN communication system, the device proximity message based on proximity of the multi-mode wireless communication device to the DAP; and
a processor for selecting the DAP from the plurality of access points based on a relationship to a criteria area and for generating control information to configure the DAP to transmit the reverse link information, the plurality of access points comprising a non-detecting access point (NDAP) configured, at least temporarily, not to transmit any reverse link information related to any wireless wide area network (WWAN) signals transmitted from any multi-mode wireless device.

38. The WLAN controller of claim 37, further comprising:
a processor configured to generate the device proximity message based on the reverse link information.

39. The WLAN controller of claim 38, wherein the device proximity message comprises a request to establish wireless service to the multi-mode wireless communication device from the mesh network communication system.

40. The WLAN controller of claim 38, the access point interface further configured to receive other reverse link information from another detection access point configured to provide WLAN service within another DAP service area, the other reverse link information related to the reverse link WWAN signal received at the another detection access point, wherein the device proximity message is further based on the other information.

* * * * *